C. C. DOTSON.
COTTON CHOPPING MACHINE.
APPLICATION FILED OCT. 7, 1914.
1,282,776.
Patented Oct. 29, 1918.
2 SHEETS—SHEET 1.
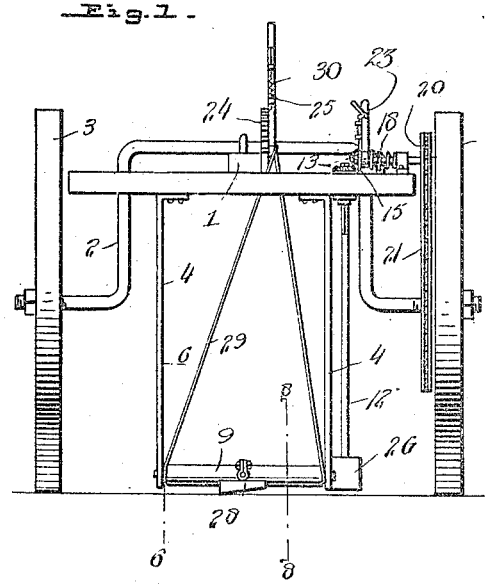
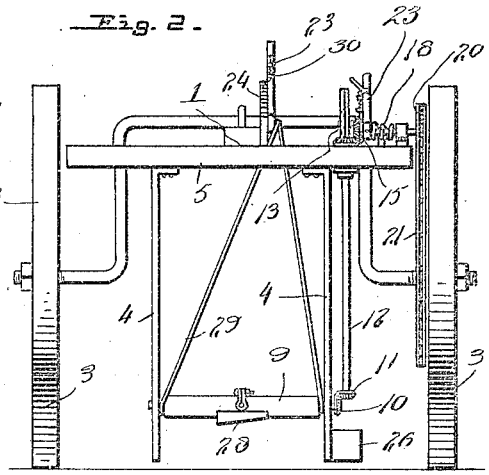
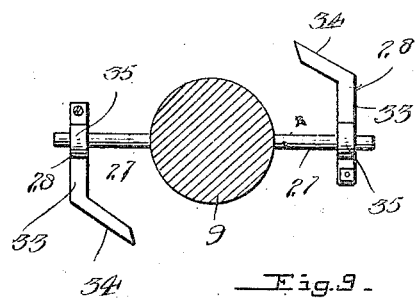
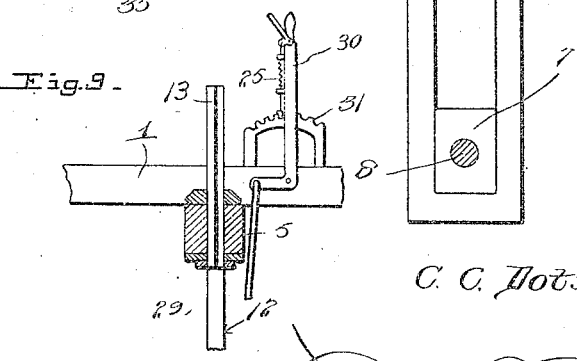
Inventor
C. C. Dotson.
Witnesses

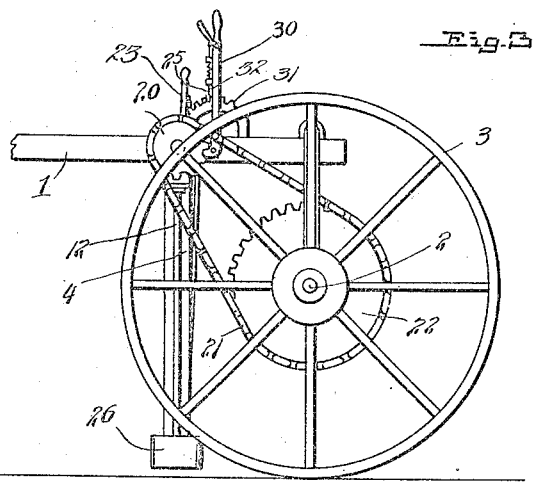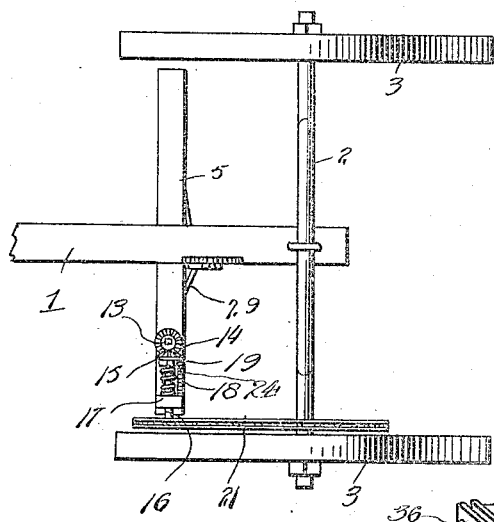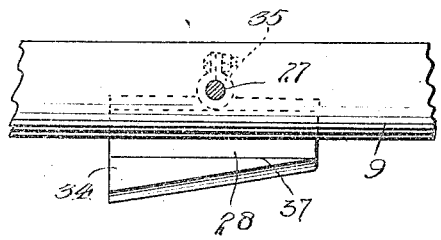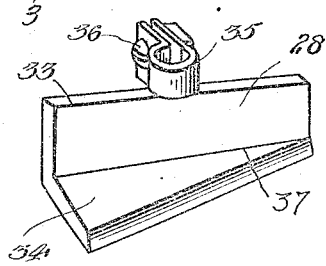

UNITED STATES PATENT OFFICE.

CHRISTOPHER C. DOTSON, OF HUZZAH, MISSOURI.

COTTON-CHOPPING MACHINE.

1,282,776. Specification of Letters Patent. Patented Oct. 29, 1918.

Application filed October 7, 1914. Serial No. 865,522.

*To all whom it may concern:*

Be it known that I, CHRISTOPHER C. DOTSON, a citizen of the United States, residing at Huzzah, in the county of Crawford, State of Missouri, have invented certain new and useful Improvements in Cotton-Chopping Machines; and I do hereby declare the following to be a full, clear, and exact description of the invention, such as will enable others skilled in the art to which it appertains to make and use the same.

This invention relates to a cotton chopping machine.

An object of the invention is to provide a device of this character which will "block out" the cotton or reduce the cotton rows to a series of equi-distant hills.

A further object of the invention is to adjustably mount the hoes so that the resultant cutting edges of the same may be varied and consequently the distance between the hills varied.

A still further object is to so construct the device as to handle the hoes inoperative without raising the same.

With these and other objects in view, such as will appear as the description progresses, my invention comprises the combination and arrangement of parts as herein set forth and subsequently claimed.

Referring to the drawing:

Figure 1 is a front elevation of my device attached to a cultivator, with the hoes in their operative positions.

Fig. 2 is a similar view with the hoes raised.

Fig. 3 is a side elevation.

Fig. 4 is a plan view.

Fig. 5 is a detail of the hoes showing the manner of mounting the same.

Fig. 6 is a section on line 6—6 of Fig. 1.

Fig. 7 is a detail of one of the hoes.

Fig. 8 is a section on line 8—8 of Fig. 1.

Fig. 9 is a fragmental detail.

Referring to the drawing by reference characters wherein like parts are indicated by like characters throughout the several views:

The tongue of the cultivator is indicated by the reference character 1 and on this tongue is mounted an axle 2 of arched formation having wheels 3 thereon.

My device is arranged to be attached forwardly of the cultivator mechanism and is attached thereto in the following manner.

A pair of downwardly extending brackets 4 are attached to a cross beam 5 on the tongue 1. These brackets have longitudinally extending slots 6 in their lower ends in which are slidably mounted bearings 7.

Extending between these bearings and rotatably mounted therein is a shaft 8 having a beam 9 mounted thereon through which the shaft extends.

One end of the shaft 8 is extended through the bearings 7 and has a beveled gear 10 on its end, which meshes with the beveled gear 11 on the lower end of a vertical shaft 12 which extends upwardly through the beam 5 and is squared at its upper end, as at 13.

Slidably mounted on this squared end of the shaft 12, but prevented from rotation is a beveled gear 14 which meshes with a beveled gear 15 on the horizontal shaft 16, which shaft is mounted in bearings 17 on the beam 5 and is slidable therethrough.

In order that the gear 15 may be normally kept in mesh with the gear 14 a coil spring 18 encircles the shaft 16 and bears against one of the bearings 17 and against a collar 19 rotatably mounted on the saft 16, which collar is integral with the gear 15.

On the outer end of this shaft 16 is a sprocket wheel 20, over which a chain 21 passes, which chain also passes over a sprocket 22 mounted on the main wheel 3.

In order that the gears 14 and 15 may be disengaged, I have provided a lever 23 engaged with the collar 19 and operable on a quadrant 24 to throw the gears out of intermeshing engagement and maintain the same in such inoperative position by a pawl 25 engaging the teeth of the quadrant 24.

In order that the gears 10 and 11 may be protected as these gears are touching the ground, I have covered the same with a casing 26 secured to the adjacent bracket 4.

On the beam 9 are outwardly extending rods 27 which extend from diametrically opposite points and on the end of each of these rods is adjustably mounted a hoe 28 so that when the said beam is rotated, the hoes will be rotated therewith to cut the rows into spaced hills.

In order that these hoes may be raised when not in operation, I have attached cables 29 to the beam 9, and joined the same together at their upper ends.

A lever 30 is connected to the cables at this point and by means of this lever which is operable on a quadrant 31 the said hoes are raised and are held in their raised position by a pawl 32 on the lever 30 which engages the teeth on the quadrant 31.

Each of the hoes is adjustably mounted on the rod 27 in the following manner:

In the first place the hoes are of angular formation in cross section and have an upwardly extending web 33 and an outwardly extending web 34 which is tapered from one end to the other, and this outwardly extending web forms the hoe proper, that is the portion which digs into the ground.

On the upper edge of the web 33 is mounted a collar 35 having a set screw 36 passing therethrough and by means of this collar the hoe is mounted on the rod 27 and secured thereto by the set screw 36.

It may be thus seen that by mounting the hoe in this manner it will be readily adjustable, and by swinging the hoe about the rod 27 and securing it in any one of a number of positions the length of the cutting portion of the web 34 may be varied, that is when the toe 37 of the web 34 is pushed downwardly this engages the ground first and before the entire edge of the web 34 cuts the ground the rotation of the beam 9 will lift the hoe from the ground so that the resulting cut is comparatively small. To increase the width of the cut between the hills it is necessary to swing the toe of the web 34 upwardly, which results in the swinging of the heel of the said web downwardly and consequently a greater portion of the web will engage the ground. At the same time that the hoe is adjusted in the manner above described it is swung about the collar 35 as a pivot.

From the foregoing description it may be seen that I have provided a device which may be readily attached to a cultivator by means of which cotton may be blown off, that is hills may be formed of the rows, and I have further provided hoes adjustably mounted on their actuating beams in such manner that the distance between the hills may be varied at will.

I do not wish to be limited to the particular construction shown, for it is obvious that numerous changes may be made within the scope of the invention as defined by the claim:

What is claimed is:—

In a cultivator, the combination with a rotatable beam, a rod fixed to said beam and having portions arranged on diametrically opposite sides thereof, hoes having vertical and horizontal webs, the horizontal web of each hoe being tapered from one end to the other to form heel and toe portions, and collars carried by the vertical webs and mounted upon said rod on opposite sides of said beam and adjustable toward and away therefrom, said collars permitting the hoes to be swung about the rod as a pivot whereby to vary the degree of cut by the hoes.

In testimony whereof I affix my signature in the presence of two witnesses.

CHRISTOPHER C. DOTSON.

Witnesses:
 IDA BOGAN,
 J. E. SANDERS.